United States Patent [19]

Williams

[11] Patent Number: 4,766,921

[45] Date of Patent: Aug. 30, 1988

[54] METHOD OF OPERATING A PWM SOLENOID VALVE

[75] Inventor: Leonard J. Williams, East Aurora, N.Y.

[73] Assignee: Moog Inc., East Aurora, N.Y.

[21] Appl. No.: 920,303

[22] Filed: Oct. 17, 1986

[51] Int. Cl.$^4$ ............................................. F16K 31/06
[52] U.S. Cl. ................................ 137/1; 251/129.05; 251/129.08; 91/459; 137/625.65
[58] Field of Search ............... 251/129.05, 129.08; 137/330, 625.65; 91/459

[56] References Cited

U.S. PATENT DOCUMENTS

| | | | |
|---|---|---|---|
| 4,103,695 | 8/1978 | Aono | 251/129.08 X |
| 4,192,551 | 3/1980 | Weimer et al. | 91/459 X |
| 4,345,737 | 8/1982 | Kawai et al. | 251/129.08 X |
| 4,361,164 | 11/1982 | Sakakibara et al. | 137/487.5 X |
| 4,466,337 | 8/1984 | Eiler | 137/625.65 X |
| 4,638,837 | 1/1987 | Buike et al. | 251/129.05 X |
| 4,651,535 | 3/1987 | Alsenz | 251/129.05 X |

*Primary Examiner*—Arnold Rosenthal
*Attorney, Agent, or Firm*—Sommer & Sommer

[57] ABSTRACT

The invention provides an improved method of operating a pulse-width-modulated solenoid valve so as to improve the proportionality of the flow-to-command pulse width characteristics of the valve. A train of command pulses ($P_1, P_2, \ldots P_n$), having widths corresponding to the desired flow through the valve, is superimposed on another train of pre-pulses ($p_1, p_2, \ldots p_n$). Each pre-pulse is timed to appear immediately ahead of an associated command pulse so that their widths will be effectively summed. The pre-pulses have widths necessary to substantially eliminate the "deadzone" in the flow-to-pulse width characteristics of the valve. Hence, the proportionality of the flow-to-command pulse width characteristics of the valve will be substantially improved.

13 Claims, 3 Drawing Sheets

ZERO-LAPPED

OVER-LAPPED

UNDER-LAPPED

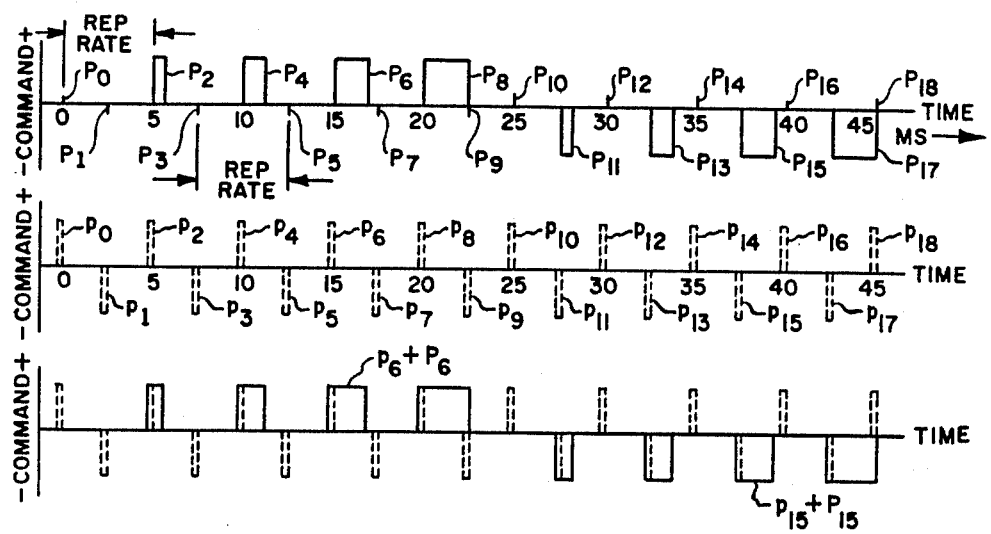
Fig.2d
Fig.3b.
Fig.3c.
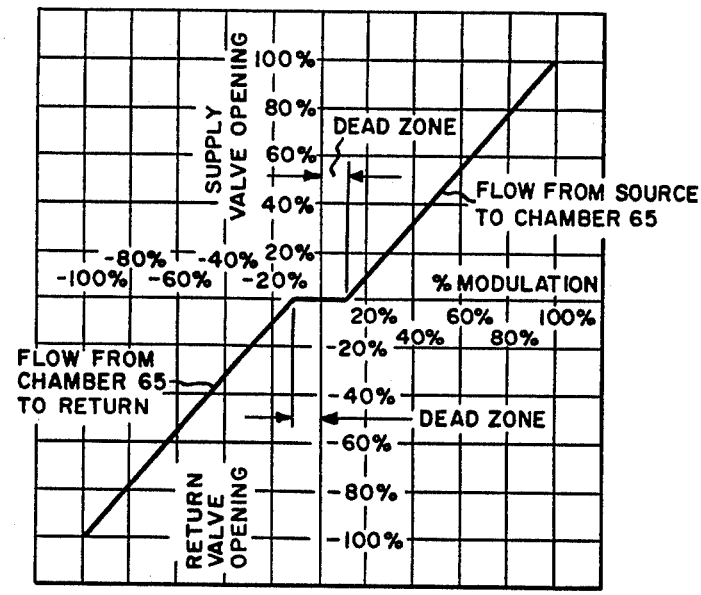
Fig.2e.
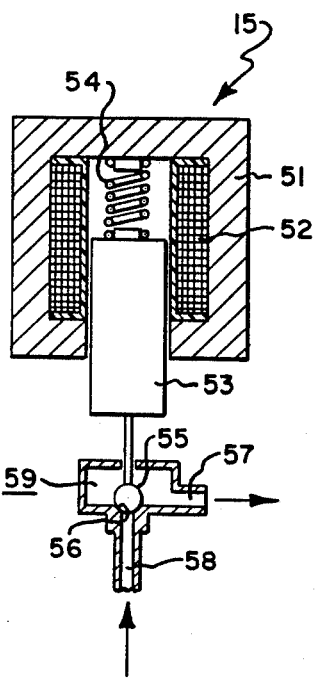
Fig.2a.
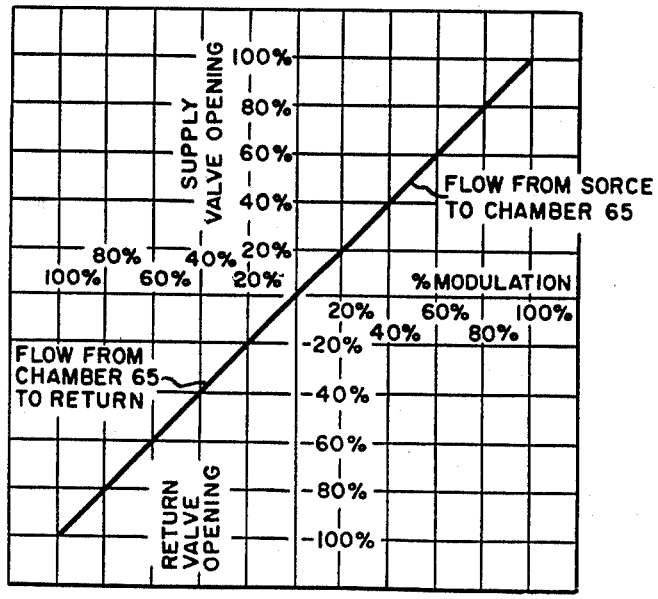
Fig.3d.

METHOD OF OPERATING A PWM SOLENOID VALVE

TECHNICAL FIELD

The present invention relates generally to the field of solenoid valves and, more particularly, to an improved method of operating a pulse-width-modulated solenoid valve so that the percentage of time that the valve is open will be substantially proportional to the widths of certain command current pulses supplied to the valve.

BACKGROUND ART

Solenoid valves are, of course, well known. In general, these devices have a body, a plunger mounted on the body for movement toward and away from a seat, a coil mounted on the body and surrounding the plunger, and a return spring acting between the body and plunger for continuously urging the plunger to move toward the seat. The coil is adapted to be supplied with an electrical current for selectively displacing the plunger away from the seat. The seat may typically surround an inlet opening, and the plunger may be force-balanced against variations in the inlet pressure.

Such solenoid valves are basically on-off devices. In other words, when the coil is de-energized, the return spring will move the plunger to engage the seat, thereby preventing flow through the valve. On the other hand, when the coil is energized, the plunger will be selectively displaced off the seat to a fully-opened position so as to permit flow through the valve.

Some solenoid valves employ centering springs to bias the plunger to a predetermined de-energized position relative to a body. By using two coils (i.e., a coil on either side of such spring-centered position) and by selectively energizing the appropriate coil, the plunger may be selectively displaced in the desired direction from such spring-centered position.

It is also known to operate a solenoid valve by a pulse-width-modulated technique. Basically, a train of command current pulses is provided to the coil at a predetermined repetition rate, and the percentage of time that the valve is open is a function of the pulse widths. By using this technique, the valve is caused to repeatedly open and close many times per second, to provide controlled flow through the valve. However, the use of such PWM-operated solenoid valves suffers from the disadvantage that the valve does not open simultaneously with the leading edges of the supplied current pulses. Applicant's experience has demonstrated that there is an initial "deadzone" in the operation of such devices. This "deadzone", is attributable to a lag in the dynamic response of the valve to the supplied current pulses.

On the other hand, an electrohydraulic servovalve is a widely-used device for providing a hydraulic output in response to an input electrical signal. In a flow-control servovalve, such as shown and described in U.S. Pat. No. 3,023,782, the aggregate disclosure of which is hereby incorporated by reference, the output flow of the valve is substantially proportional to the magnitude and polarity of the input current. Other types of proportional valves (e.g., two-way, three-way and four-way) are also known. In some of these, the amount of valve opening is proportional to the magnitude of an input electrical current, as determined by applying electromagnetic force to a spring-restrained valve element.

It has been proposed to use a pulse-width-modulated solenoid valve to control the flow of gas with respect to an actuator, as an alternative to a conventional servovalve or some other proportional-type valve. See, e.g., Thayer, "Electropneumatic Servoactuation—An Alternative to Hydraulics for Some Low Power Applications", Technical Bulletin 151, Moog Inc. (1984). The motivation for this alternative arrangement is largely stimulated by a difference in costs and economics, as opposed to performance. However, the presence of the "deadzone" or lag in the dynamic response characteristics of such PWM-controlled solenoid valves, has impeded their use as alternatives to conventional servovalves or proportional-type valves, particularly when it is desired to incorporate the same into a closed-loop servosystem. In effect, the presence of the "deadzone" causes the PMW-controlled solenoid valves to have a variable or non-proportional gain (i.e., output/input) which seriously degrades the static accuracy and low amplitude/low frequency dynamic response of the servosystems in which such valves are incorporated.

DISCLOSURE OF INVENTION

The present invention provides an improved method of controlling the operation of a pulse-width-modulated solenoid valve so as to substantially eliminate the "deadzone" in the dynamic response characteristics of such valve, and to cause the percentage of time that the valve is open to be substantially proportional to the widths of the command pulses supplied to the valve. The valve has at least one member (e.g., a poppet, a spool, etc.) mounted for movement relative to another member (e.g., a seat, a sleeve, a body, etc.), and has at least one coil operatively arranged to be supplied with current for selectively displacing the one member relative to the other member.

The improved method broadly comprises the steps of: generating a repetitious train of first command pulses at a predetermined repetition rate, each of the first pulses having a width necessary to substantially eliminate the delay, or period of non-responsiveness, between the time of valve opening vs. time of pulse leading edge characteristics of the valve; generating a repetitious train of second command pulses at the same repetition rate, each of the second pulses having a width substantially proportional to a desired percentage of time that the valve is to be open; adding each second pulse to an associated first pulse so that their widths will be effectively summed; and supplying a current analog of such combined pulses to the coil; thereby to eliminate the period of non-responsiveness and to cause the percentage of time that the valve is actually open to be substantially proportional to the widths of the second pulses.

Accordingly, the general object of this invention is to provide an improved method of controlling the operation of a pulse-width-modulated solenoid valve.

Another object is to provide such an improved method in which the lag in the dynamic response characteristics of the solenoid valve, is substantially eliminated.

Still another object is to provide an improved method of operating a pulse-width-modulated solenoid valve such that the percentage of time that the valve is actually opening will be substantially proportional to the widths of command current pulses.

These and other objects and advantages will become apparent from the foregoing and ongoing written specification, the drawings, and the appended claims.

BRIEF DESCRIPTION OF THE DRAWINGS

FIG. 1h is a block diagram of a typical closed-loop position servosystem incorporating the valve and actuator shown in FIG. 1a.

FIG. 2a is an elementary schematic of a solenoid valve.

FIG. 2d is a graph of electrical signal vs. time, and depicts various arbitrarily-selected command pulses which might be supplied to the solenoid drivers in the servoactuator shown in FIGS. 2b and 2c.

FIG. 2e is a graph depicting percentage of time the valve is open vs. command pulse width for the two solenoid valves of the servoactuator shown in FIGS. 2b–2c, this view expressing the valve opening (ordinate) as a percentage of its maximum opening vs. pulse width (abscissa) as a percentage of maximum pulse width.

FIG. 3b is a graph of electrical signal vs. time, and shows the train of pre-pulses.

FIG. 3c is a graph of electrical signal vs. time, and shows the resulting wave form when the command pulses shown in FIG. 2d are added to the pre-pulses shown in FIG. 3b.

FIG. 3d is a graph depicting the percentage of time the valve is open vs. pulse width of the two solenoid valves shown in FIG. 2b, when operated according to the improved method, this view also showing the percentage of time of the valve being open (expressed as a percentage of maximum possible time of being open) as being substantially proportional to command pulse width (expressed as a percentage of maximum width) when the command pulses are added to the pre-pulses.

MODE(S) FOR CARRYING OUT THE INVENTION

Figure 1A:
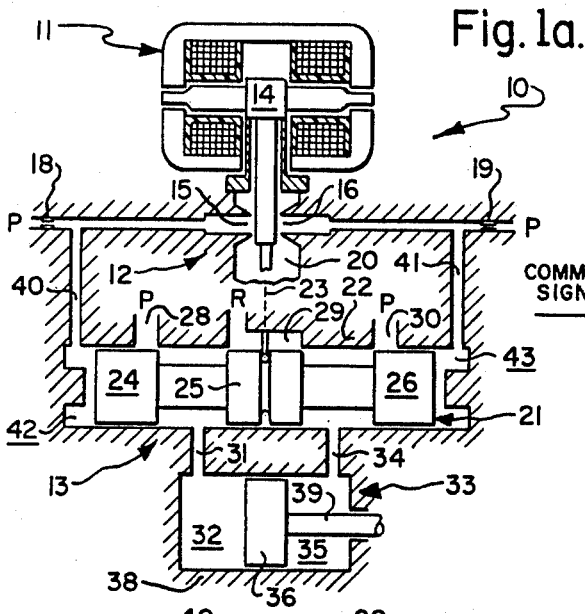
FIG. 1a is a schematic view of a prior art two-stage electrohydraulic flow-control servovalve in association with a double-acting fluid-powered actuator.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. The drawings are intended to be read (e.g., cross-hatching, arrangement of parts, etc.) together with the specification, and are to be considered a portion of the entire "written description" of this invention as required by 35 U.S.C. §112. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Unless otherwise indicated, the terms "inwardly" and "outwardly" refer to the orientation of a surface relative to its axis of elongation, or axis of rotation, as appropriate.

The present invention provides an improved method of operating a pulse-width-modulated (PWM) solenoid valve such that the percentage of time that the valve is open will be substantially proportional to command pulse width. The improved method causes the solenoid valve to exhibit performance characteristics more closely simulating those of a proportional flow-control servovalve, and enhances the use of such solenoid valves in closed-loop servosystems.

However, before proceeding to a description of the improved method, it is deemed advisable to review the structure and operation of two prior art closed-loop servoactuators, one employing an electrohydraulic servovalve and the other having PWM-operated solenoid valves.

PRIOR ART ELECTROHYDRAULIC SERVOVALVE (FIGS. 1a–1h)

Referring now to FIG. 1a, a prior art electrohydraulic servovalve, generally indicated at 10, is shown as broadly including a torque motor 11, a first stage or hydraulic amplifier section, generally indicated at 12, and a second stage or output section, generally indicated at 13.

The torque motor is adapted to be provided with an input electrical current, of known magnitude and polarity, and functions to produce a proportional torque on an armature-flapper member 14, which is positioned between two opposed nozzles 15,16. Fluid flows from a suitable source (not shown) through a left conduit containing restricted orifice 18 to the left nozzle 15. Similarly, fluid also flows separately from the same or another source (not shown) through a right conduit containing restricted orifice 19 to the right nozzle 16. Fluid discharged through the opposed nozzles toward the flapper member passes into a common chamber 20, which communicats with a fluid return.

The second stage 13 includes a multi-lobed valve spool 21 mounted within a bore for horizontal sliding movement relative to a body 22. A feedback spring wire, indicated by dashed line 23, communicates the spool middle lobe with the armature-flapper member, and functions to return the armature-flapper member to a centered position between the two nozzles when the spool is in the commanded position. When the spool is in a centered or "null" position relative to the body (as shown in FIG. 1a), the right marginal end portion of spool left lobe 24 covers a left body slot 28, which communicates with a source of fluid pressure P; the spool middle lobe 25 covers a middle body slot 29, which communicates with a fluid return R; and the left marginal end portion of spool right lobe 26 covers a right body slot 30, which also communicates with a fluid source, again indicated at P.

A conduit 31 communicates the space between left and middle lobes 24,25 with the left chamber 32 of a conventional fluid-powered actuator 33, while a similar conduit 34 communicates the space between middle and right lobes 25,26 with an opposed right chamber 35 of the actuator. These two actuator chambers 32,35 are separated by a piston 36, slidably movable within a cylindrical bore provided in actuator body 38. An actuator rod 39 extends rightwardly from the piston and slidably penetrates the cylinder right end wall.

An electrical command signal, typically in the form of a current having a desired magnitude and known polarity, is supplied to the torque motor to selectively vary the position of the armature-flapper member relative to the two nozzles. If the armature-flapper member is moved more closely to left nozzle 15 and farther from right nozzle 16, the pressure upstream of the left nozzle will increase, while the pressure upstream of the right nozzle will decrease. Conversely, if the armature-flapper member is moved more closely to right nozzle 16, the opposite would obtain. In either event, this pressure differential is supplied via conduits 40,41 to left and right spool end chambers 42, 43, respectively, and is used to selectively displace the spool either leftwardly or rightwardly, as desired, from its centered or "null" position relative to the body.

Such valves are called "two-stage", because the first or pilot stage is used to control the operation of the second or output stage. Additional details as to the structure and operation of such prior art servovalves are shown and described in U.S. Pat. Nos. 2,964,059 and 3,023,782, and in ARP 490B, "Electrohydraulic Flow-Control Servovalves", Society of Automotive Engineers, Inc. (4/30/70) the aggregate disclosures of which are hereby incorporated by reference insofar as the structure and operation of such valves are concerned.

Figure 1H:
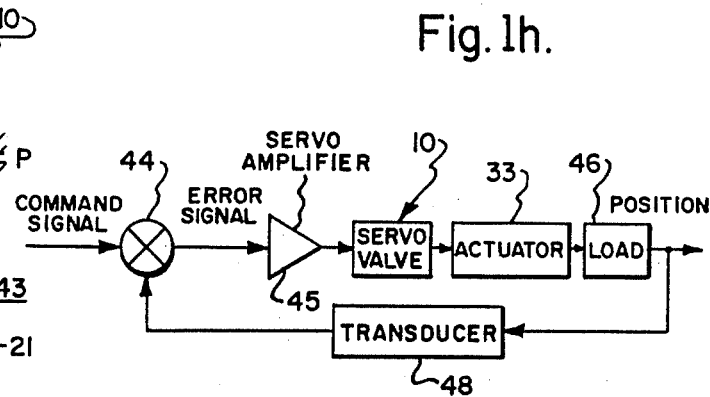
Figure 1B:
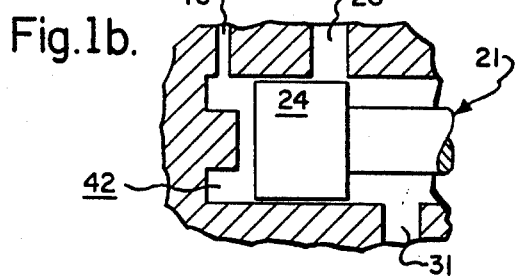
FIG. 1b is an enlarged detail view of the leftwardmost spool lobe shown in FIG. 1a, this view showing this lobe as being zero-lapped with respect to the body supply slot when the spool is in its "null" position.
Figure 1C:
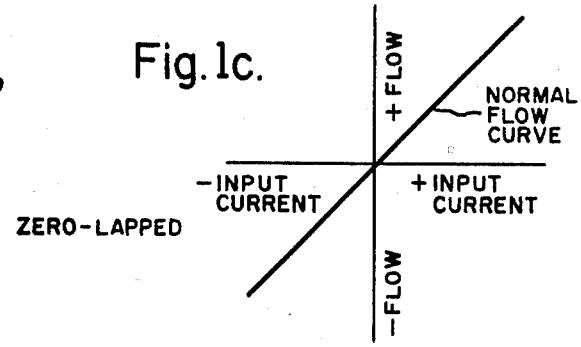
FIG. 1c is a graph depicting valve opening (and typically flow to and from the actuator) vs. input current, for a zero-lapped valve spool, the leftwardmost lobe of which is shown in FIG. 1b.

If the various spool lobes just cover the associated body slots when the spool is in its centered or "null" position, as representatively shown in FIG. 1b, the extent of valve opening, and hence flow through the valve, would be substantially proportional (i.e., $Q=ki$ where Q is flow, k is a constant, and i is coil current) to the magnitude and polarity of the input current, as shown in FIG. 1c.

Figure 1D:
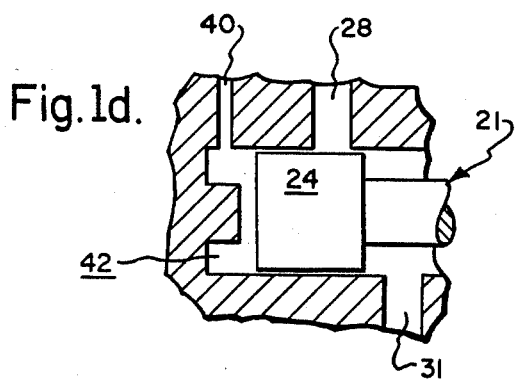
FIG. 1d is an enlarged detail view of the leftwardmost spool lobe shown in FIG. 1a, but showing this lobe as now overlapping the associated body supply slot when the spool is in its "null" position.
Figure 1E:
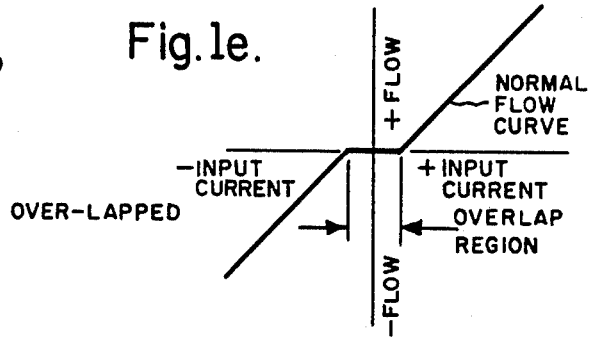
FIG. 1e is a graph depicting valve opening vs. input current for the valve spool having an overlapped spool, the leftwardmost lobe of which is shown in FIG. 1d, this view also showing the "deadzone" attributable to the overlap as appearing on the abscissa.

However, if the spool lobes overlap the body slots in the "null" position, as representatively shown in FIG. 1d, the hydraulic output of the valve is not proportional to the command signal. Rather, because of such overlap, there is a displacement range within which movement of the spool relative to the body will not produce a corresponding valve opening. This period of non-responsiveness is indicated as being a "deadzone" in FIG. 1e.

Figure 1F:
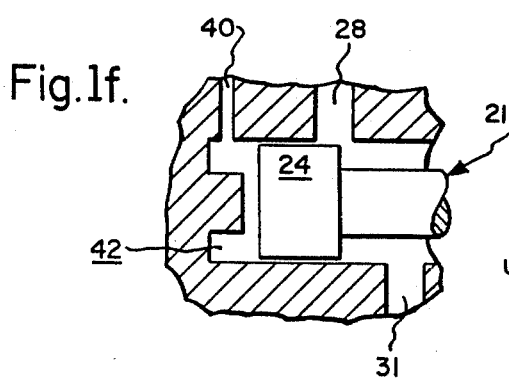
FIG. 1f is an enlarged detail view of the leftwardmost spool lobe shown in FIG. 1a, but showing this lobe as now being underlapped with respect to the associated body supply slot when the spool is in its "null" position.
Figure 1G:
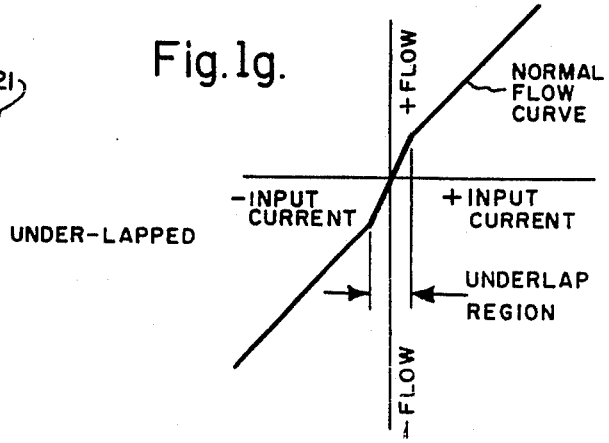
FIG. 1g is a graph depicting valve opening vs. input current for the underlapped valve spool shown in FIG. 1f, this view also showing the non-proportionality of flow attributable to such underlap or "open-center" condition of the valve-controlled orifices throughout the entire range of input current.

On the other hand, if the spool lobe is underlapped, as representatively shown in FIG. 1f, such that the lobes do not cover and close the associated body slots when in the "null" position, fluid will flow through the valve, notwithstanding the absence of an input current, as shown in FIG. 1g. Such an underlapped valve produces a non-linearity of flow with respect to input current throughout the entire range of such current. The valve gain, K, approaches twice its nominal value as the valve spool simultaneously controls flows through the pressure and return slots.

FIG. 1h is a block diagram of a typical closed-loop position servosystem in which servovalve 10 and actuator 33 are typically incorporated. An electrical command signal, reflective of the desired position of the actuator rod, is supplied to a summing point 44. This summing point is also supplied with a negative feedback signal, reflective of the actual position of the rod. The command and feedback signals are algebraically summed at the summing point, and the difference therebetween is supplied as an error signal to a servoamplifier 45, which, in turn, supplies a proportional current of the appropriate polarity to the torque motor of servovalve 10. As pointed out above, if the spool was zero-lapped, the servovalve produces a proportional fluid output, which was supplied to the actuator. The output of the actuator, selectively displaces a load 46. The actual position of the load is sensed by feedback transducer 48, and a corresponding electrical signal is supplied as the feedback signal to summing point 44. By use of such a closed-loop position servo, the load is caused to move to the commanded position. However, it is generally desirable to have the output of each system component (i.e., amplifier, servovalve, actuator, etc.) be substantially proportional to its input. In other words, each system component should have a substantially constant gain (i.e., gain=output/input).

PRIOR ART ACTUATOR WITH PWM SOLENOID VALVES (FIGS. 2a–2e)

As indicated infra, it has been proposed to employ pulse-width-modulated solenoid valves in lieu of conventional servovalves. The reasons for this contemplated change are largely related to a desire to reduce costs, as opposed to an attempt to improve performance.

In any event, an elementary schematic of a prior art solenoid valve is shown in FIG. 2a. This valve, generally indicated at 50, has a body 51, a coil 52, a plunger or armature 53, and a return spring 54 acting between the body and the plunger. A valve element 55, such as a poppet, is mounted on the plunger for movement therewith toward and away from a seat 56. The seat surrounds an inlet opening 58 and faces into a chamber 59 in which the valve element is arranged. An outlet opening 57 also communicates with chamber 59.

When the coil is de-energized, spring 54 expands to urge the plunger to move downwardly until valve element 55 sealingly engages seat 56, thereby preventing flow from the inlet opening to the chamber. On the other hand, when a suitable electrical current is supplied to the coil, the plunger moves upwardly relative to the body, thereby causing valve element 55 to move away from seat 56, and thus permitting flow through the valve.

If controlled by a PWM technique, the coil would be supplied with a repetitious train of current pulses, as developed by a solenoid driver, at a predetermined repetition rate to cause the plunger to oscillate back and forth relative to the body, and, concomitantly, to cause the valve element to move back and forth relative to the seat. The percentage of time that the valve is open would be related to the widths of the current pulses supplied to the coil. However, between pulses, the return spring would cause the valve to close.

Figure 2B:
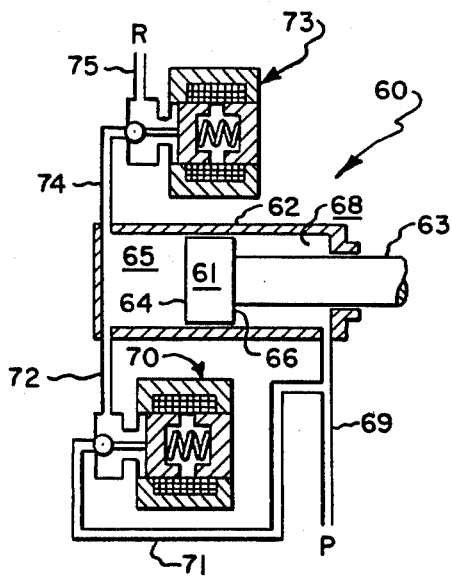
FIG. 2b is a fragmentary vertical sectional view of a prior art actuator employing two PWM-operated solenoid valves to control the flows of fluid to and from an actuator chamber.

A prior art actuator employing two of such PWM-controlled solenoid valves, is shown in FIG. 2b.

This actuator, generally indicated at 60, has a piston 61 slidably mounted within a cylindrical bore provided in a body 62. A rod 63 extends rightwardly from the piston and sealingly penetrates on the right end wall of the cylinder. The piston has a large area circular vertical left face 64 facing into a left chamber 65, and has a smaller area annular vertical right face 66 facing into a right chamber 68. The ratio of piston faces 64,66 is typically 2:1.

Conduit 69 continuously communicates actuator chamber 68 with a fluid source (not shown), at a supply pressure P. Two solenoid valves are arranged to control the flows of fluid into and out of actuator left chamber 65. A supply valve 70 receives fluid from the source via conduit 71, which communicates with conduit 69. The outlet of valve 70 communicates with chamber 65 via conduit 72. The return solenoid 73 has its inlet communicating with chamber 65 via conduit 74, and has its outlet communicating with a fluid return R via conduit 75.

Thus, when a suitable current is provided to the coil of supply valve 70, its plunger and valve element will move away from its seat, to allow flow from the source into actuator left chamber 65. Conversely, when the return solenoid is selectively energized, fluid may flow from chamber 65 to the fluid return. These solenoid valves were operated by a PWM technique, and were used to selectively vary the pressure in actuator chamber 65 and, hence, the position of the piston and rod relative to the actuator body.

Figure 2C:
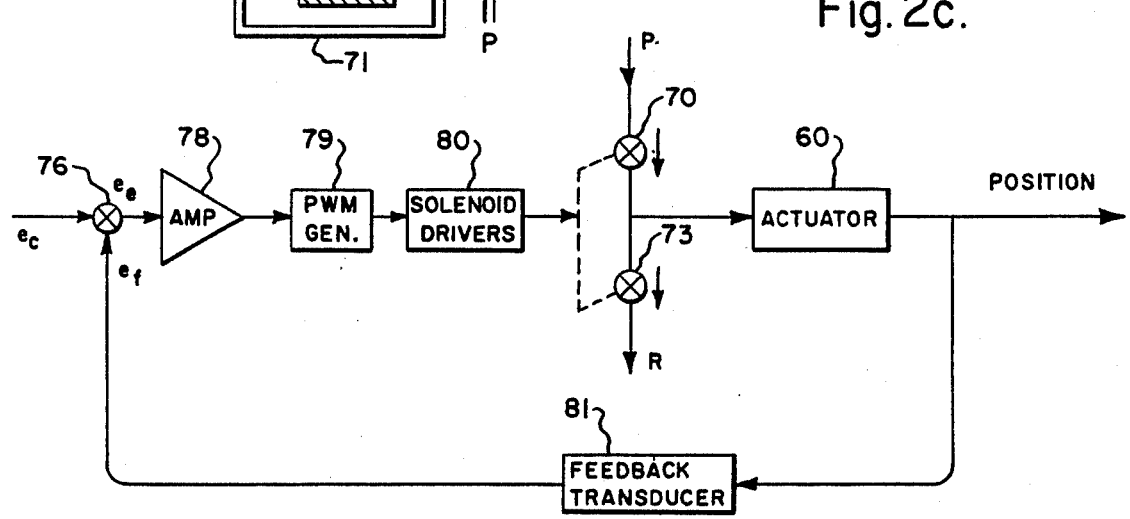
FIG. 2c is a block diagram of a prior art closed-loop position servosystem incorporating the solenoid valves and the actuator shown in FIG. 2b.

The actuator shown in FIG. 2b could be incorporated into a closed-loop position servosystem, such as shown in FIG. 2c. An electrical command signal $e_c$, reflective of the desired position of the rod relative to the actuator body, is supplied to a summing point 76, which also receives a feedback signal $e_f$ reflective of the actual position of the rod relative to the body. The command and feedback signals are algebraically summed at summing point 76, and the difference therebetween is supplied as an error signal $e_e$ to a servoamplifier 78. The servoamplifier stimulates a pulse width generator 79 to produce a train of command pulses at a predetermined repetition rate. The widths and polarity of these pulses are proportional to the magnitude and polarity of the error signal. These pulses are supplied to electrical drivers 80 which develop analog current pulses in the coils of the solenoid valves 70,73 via polarity screening filters (not shown). Thus, for example, the supply solenoid only responds to positive pulses, and the return solenoid only responds to negative pulses. In any event, the supply and return solenoids repeatedly open in a manner related to the polarities and widths of the supplied pulses, to selectively admit fluid to, or vent fluid from, control chamber 65. If the supply solenoid is opened, fluid is admitted to chamber 65, and the pressure acting on piston face 64 increases. Conversely, if the return solenoid is alternatively opened, fluid is vented from chamber 65, and the pressure acting on piston face 64 decreases.

As previously noted, supply pressure is continuously admitted to chamber 68 to bias the piston to move leftwardly. On the other hand, the pressure in control chamber 65 acts on the larger-area face 64 of the piston, and urges the piston to move rightwardly relative to the body. Hence, by selectively varying the pressure in chamber 65, the position of the rod relative to the body can be varied. A feedback transducer 81 is arranged to sense the actual position of the rod relative to the body, and supplies a corresponding electrical signal as the feedback signal to summing point 76. Thus, the closed-loop control system of this actuator closely resembles that of the servosystem shown in FIG. 1h.

FIG. 2d is a graph of electrical signal vs. time, and shows a train of various arbitrarily-selected pulses which might be supplied to the solenoid drivers. The leading edges of various positive pulses are separated by the repetition rate. Similarly, the leading edges of the various negative pulses are also separated by the same repetition rate. However, the leading edges of the negative pulses are timed to appear midway between those of the positive pulses. The repetition rate is typically on the order of 150–250 pulses per second. In FIG. 2d, the repetition rate has been assumed to be 200 pulses per second. Hence, the leading edges of the various positive pulses are separated by intervals of 5 milliseconds (i.e., 0.005 seconds). Similarly, the leading edges of the various negative pulses are also separated by like intervals of 5 milliseconds, but are timed to appear at the midpoints of the intervals between the positive pulses. Thus, the leading edges of the various sequential positive pulses appear at t=0, 5, 10, 15, 20, ... milliseconds, and the leading edges of the various negative pulses appear at t=2.5, 7.5, 12.5, 17.5, 22.5, ... milliseconds. The various positive pulses have been individually identified as $P_0$, $P_2$, $P_4$, $P_6$, $P_8$, ... , and the intervening negative pulses have been individually identified as $P_1$, $P_3$, $P_5$, $P_7$, $P_9$, ... .

The width of each pulse can be selectively varied from zero to a maximum amount determined by the appearance of the next sequential pulse of opposite polarity. In this example, the sequential pulse of opposite polarity appears 2.5 milliseconds after the leading edge of the previous pulse. Hence, the maximum width of any pulse is 2.5 milliseconds. The width of any particular pulse can be represented in terms of its percentage of the maximum pulse width, thus being termed "% modulation". Thus, in the example, % modulation=actual pulse width/maximum pulse width=actual pulse width/2.5 milliseconds.

FIG. 2d simply illustrates the variety of pulses which could possibly be supplied to the solenoid valves. For example, pulses $P_0$, $P_1$, $P_3$, $P_5$, $P_7$, $P_9$, $P_{10}$, $P_{12}$, $P_{14}$, $P_{16}$ and $P_{18}$ are non-existant because each has a zero width (i.e., zero % modulation). Pulses $P_2$ and $P_{11}$ are of 25% modulation and therefore have individual widths of 0.625 milliseconds; pulses $P_4$ and $P_{13}$ are of 50% modulation, and have widths of 1.25 milliseconds; pulses $P_6$ and $P_{15}$ are of 75% modulation, and have widths of 1.875 milliseconds; pulses $P_8$ and $P_{17}$ are of 100% modulation, and have widths of 2.5 milliseconds. The timed occurrence of the leading and trailing edges of the various individual pulses are summarized on Table I herebelow:

TABLE I

| Command Pulse | Time of Leading Edge | Time of Trailing Edge | Width | % Modulation |
| --- | --- | --- | --- | --- |
| $P_0$ | 0.0 ms | 0.000 ms | 0.000 ms | 0% |
| $P_1$ | 2.5 | 2.500 | 0.000 | 0% |
| $P_2$ | 5.0 | 5.625 | 0.625 | 25% |
| $P_3$ | 7.5 | 7.500 | 0.000 | 0% |
| $P_4$ | 10.0 | 11.250 | 1.250 | 50% |
| $P_5$ | 12.5 | 12.500 | 0.000 | 0% |
| $P_6$ | 15.0 | 16.875 | 1.875 | 75% |
| $P_7$ | 17.5 | 17.500 | 0.000 | 0% |
| $P_8$ | 20.0 | 22.500 | 2.500 | 100% |
| $P_9$ | 22.5 | 22.500 | 0.000 | 0% |
| $P_{10}$ | 25.0 | 25.000 | 0.000 | 0% |
| $P_{11}$ | 27.5 | 28.125 | 0.625 | 25% |
| $P_{12}$ | 30.0 | 30.000 | 0.000 | 0% |
| $P_{13}$ | 32.5 | 33.750 | 1.250 | 50% |
| $P_{14}$ | 35.0 | 35.000 | 0.000 | 0% |
| $P_{15}$ | 37.5 | 39.375 | 1.875 | 75% |
| $P_{16}$ | 40.0 | 40.000 | 0.000 | 0% |
| $P_{17}$ | 42.5 | 45.000 | 2.500 | 100% |

FIG. 2e is a graph illustrating the percentage of time that the valve is open vs. pulse width for the two solenoid valves shown in FIG. 2b. The ordinate expresses the length of time that the valve is actually open as a percentage of the maximum possible time that it can be open, while the abscissa expresses pulse width in terms of percent modulation. FIG. 2e demonstrates that the percentage of time that the valve is open is not proportional to pulse width throughout the entire range of from 0-100% modulation. The reasons for this lag in the dynamic response characteristics include the finite time associate with building up magnetic flux in the solenoid coil, the acceleration and deceleration of the solenoid armature, and other physical realities. Specifically, in a range of small percent modulation, illustrated as being from 0-10% modulation, the supply valve will not open. However, widths of 10-100% will thereafter produce a substantially proportional response of the valve. Conversely, for small negative pulse widths, say from 0-10% modulation, the return valve will not open, but from negative pulse widths of 10-100% modulation, the return valve will substantially follow the command. Thus, the performance characteristics of the supply and return valves are not substantially proportional to pulse width command throughout the entire range of from 0 to ±100% modulation. In other words, each valve has a "deadzone" (i.e., from 0 to ±10% modulation), within which the valves do not open in response to the supplied pulses.

While the use of such PWM-controlled solenoid valves has the advantage of reduced cost, the inability of the solenoid valves to open in a manner proportional to pulse width throughout the range of 0-10% modulation, has impeded their use as an alternative to conventional servovalves, particularly when used in a closed-loop position servosystem. In other words, because the gain (i.e., output/input) of the solenoid valves is not constant, the performance of the servosystem is degraded.

IMPROVED METHOD (FIGS. 3a-3d)

The use of such PWM-controlled solenoid valves in a closed-loop servosystem can be improved by the improved method, which seeks to eliminate the "deadzone" in the dynamic response characteristics of such solenoid valves, such that the percentage of time that the valve is open will be substantially proportional to command pulse width throughout the full range of 0 to ±100% modulation of the command pulses. Hence, the gain of the solenoid valves will be substantially constant, and the use of such valves in a closed-loop control system will be enhanced.

Figure 3A:
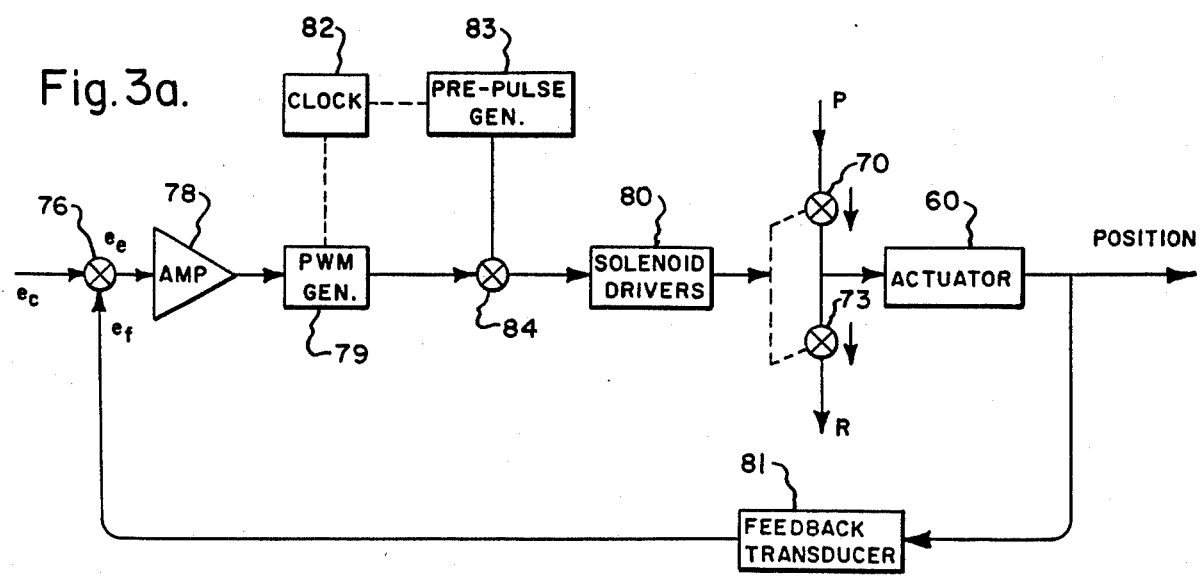
FIG. 3a is a block diagram of an improved closed-loop position servosystem, generally similar to that shown in FIG. 2c, but showing the addition of a pre-pulse generator and a summing point, at which the train of command pulses immediately follows the train of pre-pulses.

FIG. 3a is a block diagram of an improved closed-loop servosystem for use in practicing the improved method. This block diagram is similar to FIG. 2c. Hence, the same reference numerals have been used to identify like structure previously described.

However, the apparatus further includes a clock 82, a pre-pulse generator 83, and a summing point 84 operatively positioned between the command pulse generator 79 and the solenoid drivers. The pre-pulse generator continuously generates a repetitious train of alternating positive and negative pulses, at the same repetition rate as that of the command pulse generator. These pre-pulses are timed to appear immediately ahead of the various command pulses. In other words, the command pulses are added to the pre-pulses in summing point 79, and the effectively-summed widths of these combined pulses are supplied to the solenoid drivers. Clock 76 insures that the pre-pulses are timed to appear immediately before the various command pulses. The widths of the pre-pulses are selected so as to substantially eliminate the lag in the dynamic response characteristics of the associated valve.

Thus, in the example, if the "deadzone" of a valve is, say, from 0-10% modulation, the pre-pulses would have a width of 0.25 milliseconds (i.e., 10% × 2.5 ms = 0.25 ms) in order to substantially eliminate the "deadzone". The amplitude of the pre-pulses may be the same as, or different from, the amplitude of the command pulses.

FIG. 3b is a graph showing the pre-pulses as a function of time. The abscissa is of the same scale as in FIG. 2d. The pre-pulses are shown as being of the same height as the command pulses, but, as indicated above, this need not invariably obtain. The pre-pulses are indicated by the letter "p" and are individually identified by subscripts corresponding to the associated command pulses. Thus, pre-pulses $p_1, p_2, p_3, p_4, p_5, \ldots p_n$ are associated with command pulses $P_1, P_2, P_3, P_4, P_5, \ldots P_n$, respectively. Since the pre-pulses are generated at the same repetition rate, and are timed to appear immediately ahead of the associated command pulse, the trailing edge of sequential pre-pulses of like polarity are separated by a time interval of 5 milliseconds. The occurrence of the leading and trailing edges of the pre-pulses is summarized in Table II herebelow:

TABLE II

| Pre-pulse | Time of Leading Edge | Time of Trailing Edge |
| --- | --- | --- |
| $p_0$ | −.25 ms | 0.0 ms |
| $p_1$ | 2.25 | 2.5 |
| $p_2$ | 4.75 | 5.0 |
| $p_3$ | 7.25 | 7.5 |
| $p_4$ | 9.75 | 10.0 |
| $p_5$ | 12.25 | 12.5 |
| $p_6$ | 14.75 | 15.0 |
| $p_7$ | 17.25 | 17.5 |
| $p_8$ | 19.75 | 20.0 |
| $p_9$ | 22.25 | 22.5 |
| $p_{10}$ | 24.75 | 25.0 |
| $p_{11}$ | 27.25 | 27.5 |
| $p_{12}$ | 29.75 | 30.0 |
| $p_{13}$ | 32.25 | 32.5 |
| $p_{14}$ | 34.75 | 35.0 |
| $p_{15}$ | 37.25 | 37.5 |

TABLE II-continued

| Pre-pulse | Time of Leading Edge | Time of Trailing Edge |
|---|---|---|
| $p_{16}$ | 39.75 | 40.0 |
| $p_{17}$ | 42.25 | 42.5 |

FIG. 3c is a graph of electrical signal vs. time, showing the resulting wave form when the command pulse train shown in FIG. 2d is added to the pre-pulse train shown in FIG. 3b, such that their widths are effectively summed. In the example, the width of each combined pulse is the sum of the widths of a pre-pulse (0.25 ms) and the associated command pulse. Thus, the combined width of pulse 1 is $p_1+P_1$, the combined width of pulse 2 is $p_2+P_2$, the combined width of pulse 3 is $p_3+P_3$, and so on. The time of occurrence of the leading and trailing edges of the combined pulses, is summarized in Table III herebelow:

TABLE III

| Combined Pulse | Time of Leading Edge | Time of Trailing Edge | Width |
|---|---|---|---|
| $p_0 + P_0$ | −.25 ms | 0.000 ms | 0.250 ms |
| $p_1 + P_1$ | 2.25 | 2.500 | 0.250 |
| $p_2 + P_2$ | 4.75 | 5.625 | 0.875 |
| $p_3 + P_3$ | 7.25 | 7.500 | 0.250 |
| $p_4 + P_4$ | 9.75 | 11.250 | 1.500 |
| $p_5 + P_5$ | 12.25 | 12.500 | 0.250 |
| $p_6 + P_6$ | 14.75 | 16.875 | 2.125 |
| $p_7 + P_7$ | 17.25 | 17.500 | 0.250 |
| $p_8 + P_8$ | 19.75 | 22.500 | 2.750 |
| $p_9 + P_9$ | 22.25 | 22.500 | 0.250 |
| $p_{10} + P_{10}$ | 24.75 | 25.000 | 0.250 |
| $p_{11} + P_{11}$ | 27.25 | 28.125 | 0.875 |
| $p_{12} + P_{12}$ | 29.75 | 30.000 | 0.250 |
| $p_{13} + P_{13}$ | 32.25 | 33.750 | 1.500 |
| $p_{14} + P_{14}$ | 34.75 | 35.000 | 0.250 |
| $p_{15} + P_{15}$ | 37.25 | 39.375 | 2.125 |
| $p_{16} + P_{16}$ | 39.75 | 40.000 | 0.250 |
| $p_{17} + P_{17}$ | 42.25 | 45.000 | 2.750 |

Thus, by providing pre-pulses of a width necessary to substantially eliminate the "deadzone" in the dynamic response characteristics of the solenoid valves immediately ahead of the command pulses the percentage of time that the valve is actually open will now be substantially proportional to the widths of the command pulses, as shown in FIG. 3d. This may require an adjustment in the gain of the command pulse generator.

MODIFICATIONS

The present invention contemplates that many changes and modifications may be made. For example, the amplitude of the pre-pulses may be the same as, or different from, the amplitude of the command pulses. The widths of the various pre-pulses need not necessarily be the same. For example, if the supply solenoid has a "deadzone" of, say 8% modulation, and the return solenoid has a "deadzone" of, say 3% modulation, the positive pre-pulses could have a width sufficient to eliminate the supply solenoid "deadzone", but the negative pre-pulses could have a different width necessary to eliminate the return solenoid "deadzone". Thus, the positive and negative pre-pulses need not necessarily have the same width. Such an arrangement might necessitate the use of separate pre-pulse generators, one for each valve. Likewise, the invention contemplates that the widths of the pre-pulses may be varied, as desired, to achieve other solenoid valve output/command characteristics analogous to various overlap or underlap conditions in a conventional servovalve.

The improved method is not limited to use with a two-position poppet-type solenoid, such as shown in FIG. 2a. Indeed, the method could be used with a three-position solenoid, or with a solenoid controlling the position of a sliding valve spool relative to a body, as desired. The pre-pulse generator need not necessarily be separate from the command pulse generator, if a single generator could supply both pulses.

Therefore while a preferred way of practicing the improved method has been shown and described, and certain changes and modifications thereof discussed, persons skilled in this art will readily appreciate that various additional changes and modifications may be made without departing from the spirit of the invention, as defined and differentiated by the following claims.

I claim:

1. A method of controlling the operation of a pulse-width-modulated on/off-type solenoid valve, said valve having one member mounted for movement relative to another member and having at least one coil operatively arranged to be supplied with current for selectively displacing said one member relative to said other member, wherein the improvement comprises the steps of:
generating a repetitious train of first pulses at a predetermined repetition rate, each of said first pulses having a width necessary to substantially eliminate the lag in the dynamic response characteristics of said valve;
generating a repetitious train of second pulses at said repetition rate, each of said second pulses having a width proportional to a desired percentage of time that said valve is to remain open;
adding such second pulse train to such first pulse train so that the width of each of said second pulses will be effectively summed with the width of an associated one of said first pulses; and
supplying a current reflective of such combined pulse trains to said coil;
thereby to cause the actual percentage of time that said valve remains open to be substantially proportional to the widths of said second pulses.

2. The improvement as set forth in claim 1 wherein said first and second pulses have the same amplitude.

3. The improvement as set forth in claim 1 wherein said one member is a valve element mounted for movement with said plunger, and said other member is a seat.

4. The improvement as set forth in claim 3 wherein said seat surrounds an inlet opening through which pressurized fluid is admitted to said valve, and wherein said valve element is balanced against variations in the inlet pressure of said fluid.

5. The improvement as set forth in claim 1 wherein said fluid is a liquid.

6. The improvement as set forth in claim 1 wherein said solenoid valve is arranged in a closed-loop servo-system, and wherein the widths of said second pulses are related to an error signal reflective of the difference between the desired and actual outputs of said servosystem.

7. A method of controlling the flow of a fluid through an on/off-type pulse-width-modulated solenoid valve, said valve having an inlet opening, a seat surrounding said inlet opening, and a member mounted for movement toward and away from said seat, and having at least one coil operatively arranged to be supplied with current for selectively displacing said member away from said seat, wherein the improvement comprises the steps of:

generating a repetitious train of first pulses at a repetition rate, each of said first pulses having a width necessary to substantially eliminate the lag in the dynamic response characteristics of said valve;

generating a repetitious train of second pulses at said repetition rate, each of said second pulses having a width proportional to a desired percentage of time that said valve is to remain open;

combining such pulse trains so that each of said second pulses will immediately follow an associated one of said first pulses; and supplying a current reflective of such combined pulse trains to said coil;

thereby to cause percentage of time that said valve is open to be substantially proportional to the widths of said second pulses.

8. The improvement as set forth in claim 7 wherein each of said pulses has the same current magnitude.

9. The improvement as set forth in claim 7 wherein said second pulses are positioned behind said first pulses.

10. The improvement as set forth in claim 7 wherein said member is balanced against variations in said inlet pressure.

11. A method of operating an on/off-type pulse-width-modulated solenoid valve in a closed-loop servosystem, said valve having one member mounted for movement relative to another member and having a coil operatively arranged to be supplied with current for causing relative movement between said members, wherein the improvement comprises the steps of:

generating a repetitious train of first current pulses at a repetition rate, each of said first pulses having a width necessary to substantially eliminate a period of dynamic non-responsiveness of said valve;

generating a repetitious train of second current pulses at said repetition rate, each of said second pulses having a width related to the desired percentage of time that said valve is to remain open;

positioning such second pulse train with respect to such first pulse train in such a manner that the widths of said second pulses will be effectively summed with the widths of said first pulses; and supplying a current reflective of such juxtapositioned pulse trains to said coil;

thereby to improve the constancy of the gain of said servosystem.

12. A method of controlling the operation of an on/off-type pulse-width-modulated solenoid valve, said valve having one member mounted for movement relative to another member and having a coil operatively arranged to be supplied with current for causing relative movement between said members wherein the improvement comprises the steps of:

generating a first pulse having a width sufficient to substantially eliminate a time delay in the output-to-input characteristics of said valve;

generating a second pulse having a width related to the desired percentage of time that said valve is to be open;

adding said pulses such that said second pulse will immediately follow said first pulse; and supplying a current reflective of such added pulses to said coil;

thereby to improve the dynamic response of said valve.

13. A method of controlling the operation of an on/off-type pulse-width-modulated solenoid valve, said valve having two relatively-movable members and having a coil arranged to produce relative movement between said members in response to a supplied current, wherein the improvement comprises the steps of:

generating a first pulse having a width sufficient to substantially eliminate a lag in the dynamic response of said valve;

generating a second pulse having a width determined by the desired percentage of time that said valve is desired to be open;

positioning said pulses such that said first pulse will immediately precede said second pulse; and supplying a current reflective of such juxtapositioned pulses to said coil;

thereby to improve the proportionality of the dynamic response of said valve to the width of said second pulse.

* * * * *